US006834360B2

(12) United States Patent
Corti et al.

(10) Patent No.: US 6,834,360 B2
(45) Date of Patent: Dec. 21, 2004

(54) ON-CHIP LOGIC ANALYZER

(75) Inventors: William D. Corti, New Windsor, NY (US); Robert Kenny, Jr., Walden, NY (US); Joseph O. Marsh, Poughkeepsie, NY (US); Steven C. Parker, Wappingers Falls, NY (US); Frank X. Scanzano, Newburgh, NY (US); Michael Won, Highland, NY (US)

(73) Assignee: International Business Machines Corporation, Armonk, NY (US)

(*) Notice: Subject to any disclaimer, the term of this patent is extended or adjusted under 35 U.S.C. 154(b) by 129 days.

(21) Appl. No.: 09/683,091

(22) Filed: Nov. 16, 2001

(65) Prior Publication Data

US 2003/0097615 A1 May 22, 2003

(51) Int. Cl.[7] ................................................ G06F 11/00
(52) U.S. Cl. .............................. 714/37; 714/30; 714/39
(58) Field of Search .............................. 714/37, 30, 39

(56) References Cited

U.S. PATENT DOCUMENTS

| | | | | |
|---|---|---|---|---|
| 5,964,893 A | * | 10/1999 | Circello et al. | 714/39 |
| 6,142,683 A | * | 11/2000 | Madduri | 717/128 |
| 6,460,148 B2 | * | 10/2002 | Veenstra et al. | 714/39 |
| 2002/0116663 A1 | * | 8/2002 | Wood et al. | 714/30 |
| 2003/0051192 A1 | * | 3/2003 | Pillay et al. | 714/39 |
| 2003/0056154 A1 | * | 3/2003 | Edwards et al. | 714/45 |

OTHER PUBLICATIONS

Shobaki, Mohammed El and Lennart Lindh.A Hardware and Software Monitor for High–Level System–on–Chip Verification.IEEE International Symposium on Quality Electronic Design.56–61.*
Shobaki, Mohammed El and Lennart Lindh.A Hardware and Software Monitor for High–Level System–on–Chip Verification.Marc 26–28,2001.IEEE Internatioanl Sympoisum on Quality Electronic Design.56–61.*
Mosensoson, Guy. Practical Approaches to SOC Verification. Jul. 25, 2001. http://www.verisity.com/download/practical_soc_verification.pdf.*

* cited by examiner

Primary Examiner—Robert Beausoliel
Assistant Examiner—Yolanda L Wilson
(74) Attorney, Agent, or Firm—McGuire Woods LLP; Richard A. Henkler

(57) ABSTRACT

An on-chip logic analysis (OCLA) system captures data processed by a signal processing logic core embedded in a single-chip-device (SOC) without interrupting operations of the signal processing logic core. The OCLA system includes a data capturing unit embedded in the SOC device to monitor the operations of the signal processing unit and determines whether the operations satisfy predetermined trigger conditions. Once the trigger condition is satisfied, the data capturing unit captures internal data from/to the signal processing unit and transfers to an external host system. The host system controls the operations of the data capturing unit. The host system provides the captured data to an user interface for testing and debugging the operations of the SOC signal processing device.

21 Claims, 6 Drawing Sheets

USER INTERFACE

Software Trigger Point A   Software Trigger Point A
(PC_Value_1)                (PC_Value_2)

| PC | Label | Label |
|---|---|---|
| 1000 | PC_Value_1 | LOAD input into a DSP Register |
| 1002 | 1002 | LOAD starting point of addressing registers |
| 1004 | 1004 | LOAD repeat loop register with N |
| 1006 | 1006 | CLEAR multiply accumulate register |
| 1008 | 1008 | MULTIPLY-ACCUMULATE N times, update pointers |
| 100A | 100A | SHIFT to normalize result |
| 100C | PC_Value_2 | STORE result |

ON-CHIP LOGIC ANALYZER

BACKGROUND OF THE INVENTION

1. Field of the Invention

The present invention generally relates to real-time microprocessor or digital signal processor based systems and, more particularly, to testing and debugging of the real-time microprocessor or digital signal processor embedded in system-on-chip (SOC) devices.

2. Background Description

Real-time microprocessors or digital signal processors based systems pose special problems which are not present in traditional microprocessor based systems. One of the major problems is in testing and debugging these systems. Particularly, as digital signal processing (DSP) computer systems are integrated in a single chip with other system components, e.g., memory blocks and data buses, the integration introduces problems in debugging and emulation schemes. These problems come from a variety of factors, including increase of the system clock speed, a system design based on a "very high speed integrated circuit (VHSIC) hardware description language" (VHDL) core and multiple memory blocks embedded in the chip.

Traditional emulator schemes for debugging and testing the real-time signal processors, e.g., the joint test action group (JTAG) system, have relied on the ability to start and stop the processor by using a variety of mechanisms, which includes setting software breakpoints and single stepping through the machine code. A major drawback of the traditional emulation schemes for the real-time microprocessor or digital signal processor based systems is that the processor must be stopped once a breakpoint is reached or the instruction is executed. This imposes significant problems in real-time systems. For example, in the situation where a real-time DSP system is used as a digital motor controller, stopping the processor could drive an invalid control signal to the actuator, which may cause a disastrous result.

Hardware debug of real-time DSP systems presents additional problems. The architecture of modern DSP systems includes multiple address and data busses for both program and data memory spaces. Numerous combinations of these busses could be active at any one time. Particularly, in "system-on-chip (SOC)" situations where the memory is located on the same chip as the processor core, it is impossible to observe activities of these address/data busses, and, therefore, it has not been possible to debug a real-time microprocessor or DSP system by using the traditional emulation methods.

BRIEF SUMMARY OF THE INVENTION

It is therefore an objective of the present invention to provide non-obtrusive real-time debugging and testing scheme for real-time signal processing systems based on a system-on-chip (SOC) architecture.

Another objective of the present invention is to provide a on-chip logic analysis system for testing and debugging for the SOC signal processing systems without interrupting operations thereof.

Another objective of the present invention is to provide a signal processing system implemented in a single chip with a non-obtrusive real-time data acquisition capability.

Another objective of the present invention is to provide an on-chip VHSIC hardware description language (VHDL) macro with non-obtrusive real-time data acquisition capability.

Another objective of the present invention is to provide a high speed serial interface between a target system and a host system of an logic analysis system with low pinout chips.

Another objective of the present invention is to provide a multiplexing scheme for an logic analysis system to record memory buses at a higher bit stream.

Additional objectives, advantages and other features of the present invention will be set forth in part in the description which follows and will become apparent to those having ordinary skill in the art upon examination of the following or may be learned from the practice of the present invention. The advantages of the present invention may be realized and obtained as particularly pointed out in the appended claims.

According to the present invention, the foregoing and other objects are achieved in part by an on-chip logic analysis (OCLA) system which comprises a single chip device internally including a signal processing unit, a plurality of memory blocks and a data capturing unit. A host unit is externally provided to the single chip device and generates control signals to control the data capturing unit. The data capturing unit captures data processed by the signal processing unit in response to the control signals from the host unit and transfers the captured data to the host unit without interrupting operations of the signal processing unit.

Another aspect of the present invention is an on-chip very high speed integrated circuit (VHSIC) hardware description language (VHDL) macro embedded in a single chip device. The VHDL macro comprises digital signal processing (DSP) core logic and on-chip logic analysis (OCLA) logic, which is provided for capturing data processed by the DSP core logic without interrupting operations of the DSP core logic. The OCLA logic is controlled by a host unit externally provided to the single chip device.

Further, another aspect of the present invention is a single chip device comprising a signal processing unit, a plurality of memory blocks and a on-chip logic analysis (OCLA) unit. The OCLA unit captures data processed by the signal processing unit without interrupting operations of the signal processing unit. The OCLA unit is controlled by a host unit externally provided to the single chip device.

A data capturing unit is embedded within the VHDL macro of a single chip device to observe or watch the internal operations of the VHDL macro, thereby enabling non-obtrusive real-time data acquisition for data processed in the VHDL macro without interrupting any internal operation of a signal processing unit.

BRIEF DESCRIPTION OF THE SEVERAL VIEWS OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

The on-chip logic analyzer (OCLA) in accordance with this invention is a system for testing and debugging real-time system-on-chip (SOC) systems, e.g., digital signal processing chips. Thus, the present invention provides a solution to the observability problems that have not been even recognized by conventional SOC system testing/debugging schemes.

As previously mentioned, traditional emulation schemes rely on the ability to start and stop the signal processor through the use of various mechanisms. This approach is inevitable since there is no practical way to view or observe the operations of the digital signal processor without interrupting the operations of the system since all of the system components are embedded in a single chip.

Figure 1:
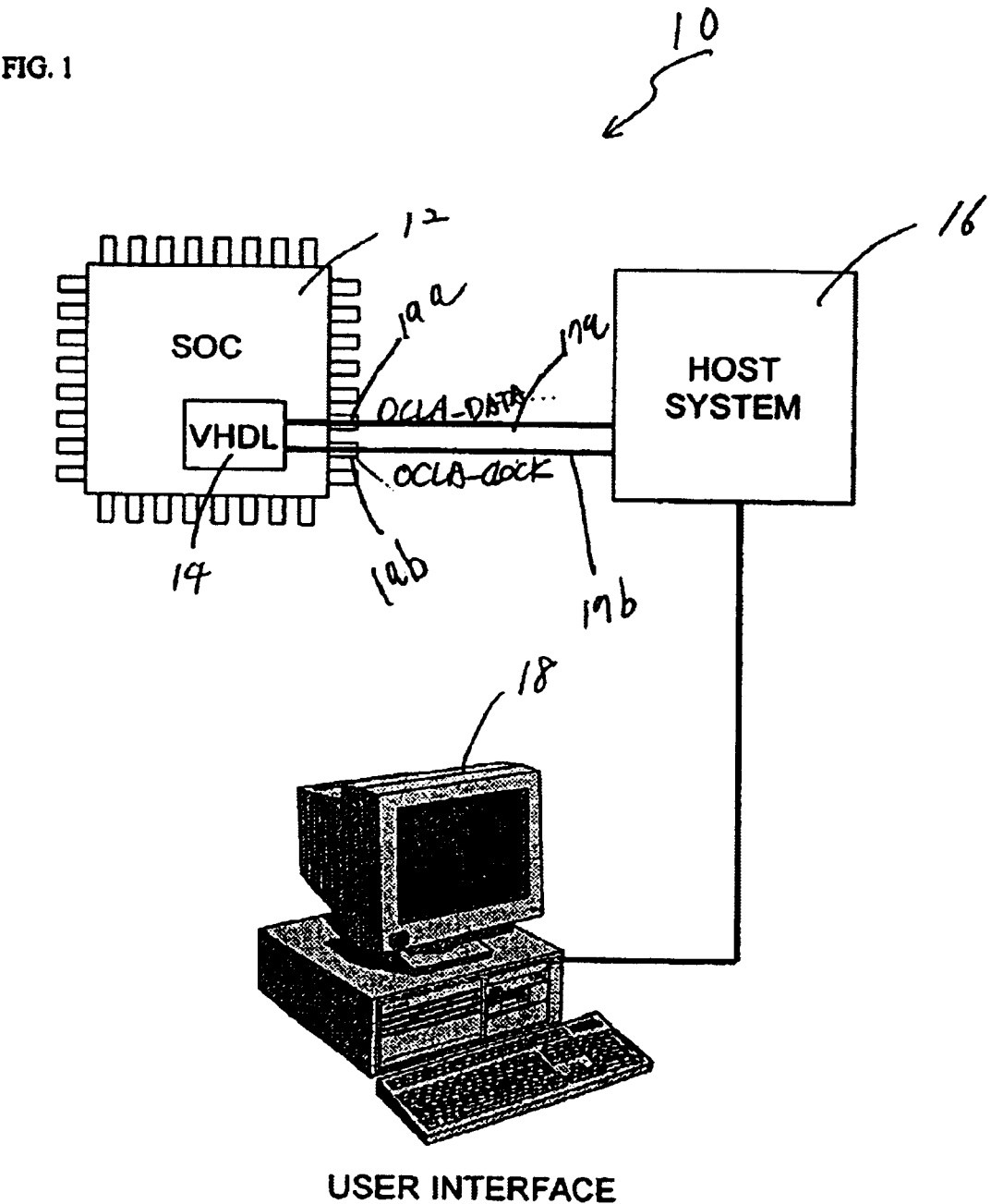
FIG. 1 depicts a block diagram of the high level overview of the OCLA system in accordance with the present invention.

With this problem in mind, referring now to the drawings, and more particularly to FIG. 1, there is shown a block diagram of the OCLA system 10 according to an embodiment of the present invention. The OCLA system 10 includes an on-chip VHDL macro 14 embedded in an SOC device 12 (i.e., target system), a host system 16, and a user interface 18. The SOC device 12 includes a signal processing logic (i.e., DSP core), memory blocks and data buses (not shown) that are universally included in traditional SOC devices. The VHDL macro 14 includes a data capturing logic which monitors the operations of other VHDL macro components, particularly data processed by the signal processing logic. Once a predetermined trigger condition is met, the data capturing logic captures and transfers the data processed by the signal processing logic to the host system 16 for testing and debugging without interrupting the operation of the target system 12. This is possible in part because the data capturing logic is embedded within the VHDL macro with other VHDL macro components.

Figure 2:
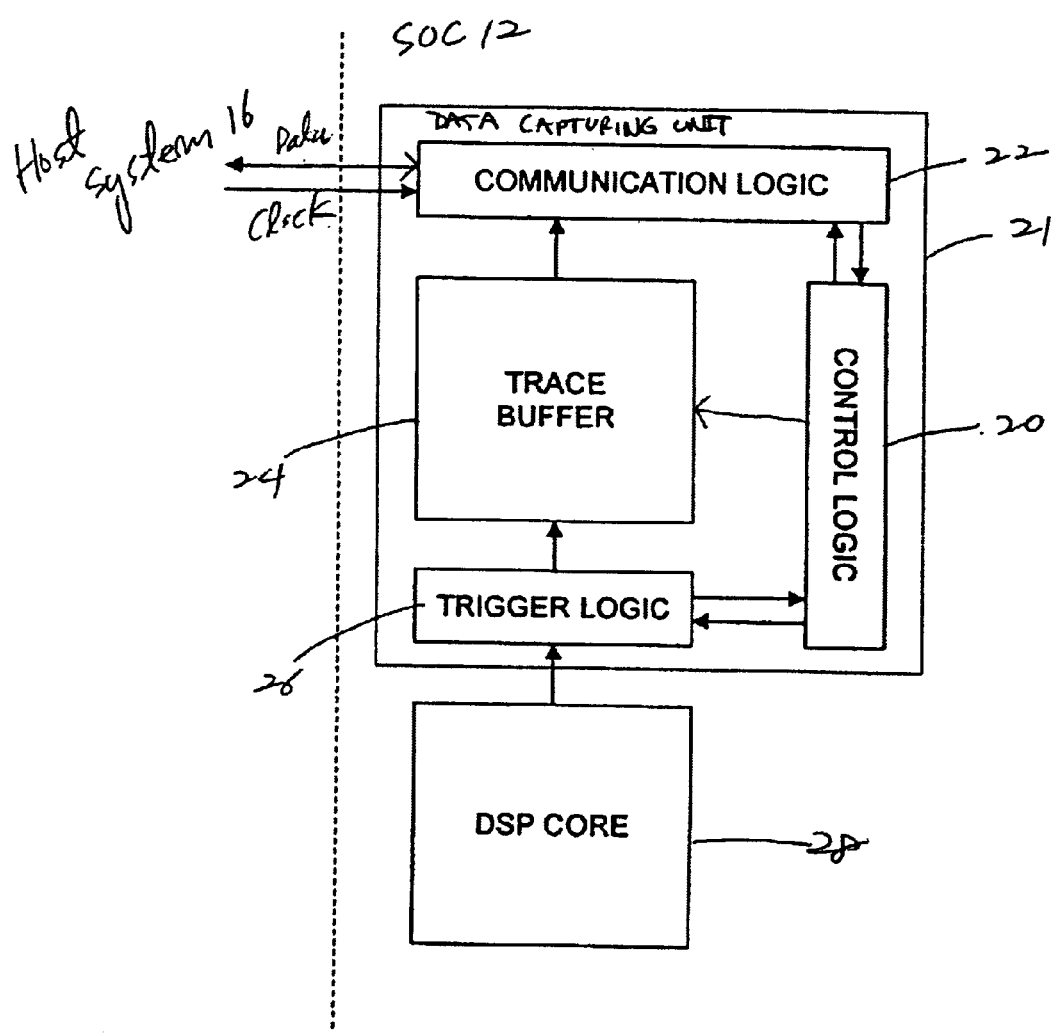
FIG. 2 depicts a block diagram of an on-chip VHDL macro within the OCLA system of FIG. 1 in accordance with the present invention.

The data capturing logic includes several functional units. As shown in FIG. 2, the VHDL macro 14 comprises a data capturing unit 21 which includes control logic 20, communication logic 22 and a trace buffer 24. The control logic 20 coordinates all operations of the OCLA portion of the VHDL macro 14. The control logic 20 includes interface logic to the communication logic 22. Upon power-on, the control logic 20 receives control signals designating a mode, a mask value and a match data and a command word from the host system 16 via the communication logic 22.

Once the "run" bit in the command word is set, the OCLA system 10 starts monitoring the operations of the VHDL macro 14 for trigger conditions. Depending on the mode which the OCLA system 10 is currently in, the control logic 20 controls the trace buffer 24 to fill up with trace words captured from the VHDL macro 14. After the trace buffer 24 has been filled up, the control logic 20 instructs the communication logic to start offloading the trace words captured in the trace buffer 24 to the communication logic 22. Trigger logic 26, which is a part of the control logic 20, monitors the operations of VHDL macro 14, particularly DSP core 28 and the data buses.

The trace buffer 24 provides a wideband data storage and controls memory accesses (e.g., 256 bit/processor cycle) and stores various states of the DSP core 28. In this embodiment, the trace buffer 24 is a SRAM block with a 256×64 bit memory space, which could be also implemented by two separate 128×64 bit SRAM. Thus, the size and configuration the trace buffer 24 could be varied depending on applications.

The communication logic 22 provides a communication interface between the data capturing unit 21 and the host system 16. The communication logic 22 takes in the control signals from the host system card 16 into the VHDL macro 14 and transfers to the control logic 20, and transfers the data captured by the trace buffer 24 to the host system. According to the present invention, the data transfer between the VHDL macro 12 and the host system 16 are performed via two pins: OCLA_DATA pin 19a, OCLA_CLOCK pin 19b, as shown in FIG. 1. The serial data signal OCLA_DATA is transferred through a serial data path 17a which is established via the OCLA_DATA pin 19a. The clock signal OCLA_CLOCK is transferred though a clock signal path 17b, which is established via the OCLA_CLOCK pin 19b. Thus, according to the present invention, only two pins are required to establish the data and clock signal paths.

The OCLA portion of the VHDL macro 14 is controlled by a host system 16. As part of the host system 16, a personal computer industrial standard architecture (PC ISA) interface card can be used to communicate with the VHDL macro 14. The interface logic on the interface card is loaded in a field programmable gate array (FPGA). An interface cable is coupled between the host system 16 and the communication logic 22 of the VHDL macro 14 to provide a serial data path 17a and a clock signal path 17b. The interface card can be further provided with a memory (e.g., 2K RAM) for storing command words and the returned trace signal from the chip 14. The memory also serves as a buffer in the real-time modes to synchronize the host system card 16 and an user interface 18 in FIG. 1.

The user interface 18, preferably a graphic user interface (GUI) based on visual basic programming software for Windows ᵃ"¢ application programs, provides an easy way to control and configure the OCLA system 10 as well as a clear view to the data captured by the OCLA system 10 for analysis and debugging. As mentioned earlier, the graphic user interface is synchronized with the host system 16 in a real-time basis.

As previously mentioned, only two pins are used for the OCLA operations: the pin 19a for the serial data transfer and the pin 19b for the clock signal transfer. These two pins 19a, 19b can be used for the current Texas Instrument ᴬ® emulation modes pins, EMU0, EMU1. This two-pin serial interface currently operates at 10 Mhz, and is controlled by a PC 18 with an interface card provided in the host system 16, as shown in FIG. 1.

The OCLA system 10 can be implemented to work with a Texas Instrument ᵃ"¢ TMS320C50 DSP chip, which will be referred to as "C50" hereafter. The C50 is a fixed-point digital signal processor which currently runs at 40 Mhz. The Program memory in C50 is divided into a number of sub-blocks to support for the paging scheme for memory access. In addition, there are three small dual-access memories which serve as data memory access. With conventional logic analyzing schemes, it has not been possible to monitor activities of these buses. Also, single instruction multiple data (SIDM) DSP instructions, which are performed by C50, require three separate buses to be active at any time because during a repeated single multiply accumulate-like instruction, three fetches are needed to be performed simultaneously. Those three fetches are next program counter (PC) fetch, data fetch and coefficient fetch. The architecture of C50 is configured such that the PC fetch can be from any one of five SRAM blocks, the data fetch can be from any one of DRAM blocks, and the coefficient fetch can bee from any one of SRAM blocks, which is not being used for the PC fetch. According to the present invention, instead of monitoring the buses on all the memories simultaneously, which would create a very long capture word, it is determined which memory is active by using an internal chip-enable (CE) signal and the determination is included in the trace word.

The OCLA system 10 is reset when a power-on reset circuit resets the chip 12. Once being reset, the OCLA system 10 is ready to receive the control signals from the host system 16, that includes commands and various data. Control to the OCLA can always be established by applying the clock signal OCLA_CLOCK and monitoring the OCLA_DATA pin 19a for 2Î¼s. If the OCLA_DATA pin does not indicate "1" in that time frame, it means that the OCLA system 10 has not been in a "RUN" mode, the OCLA_Data can then be driven, and control signals can be sent from the host system 16. If a "1" is observed on the OCLA_DATA pin 19a, it means the OCLA system 10 has been in the "RUN" mode and was interrupted. Then, a program counter (PC) interface continues to clock until all bits in the PC interface are entirely emptied. At this time, the OCLA_DATA pin 19a is driven low until the next buffer address is ready then the OCLA_DATA pin 19a is driven high again. The fact that the OCLA_DATA pin 19a goes high means that the program counter is clocking out new bits of data. This process will continue until all trace buffer addresses are emptied. At this time, the empty trace buffer 24 remains inactive and the OCLA_DATA pin 19a is tristated so that a new command word can be received. This occurs even if the auto rearm mode had been selected.

Figure 3:
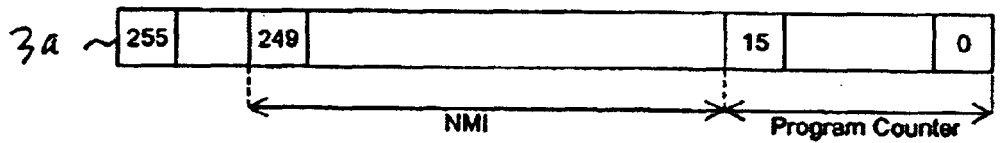
FIG. 3 depicts a data structure of a control signal transferred from a host system to a data capturing unit in accordance with the present invention.
Figure 3:
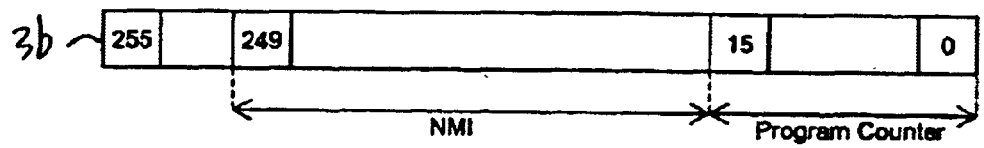
Figure 3:
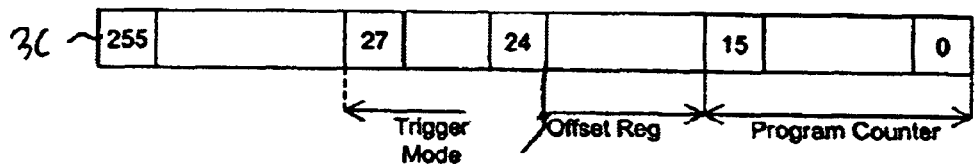
Figure 3:
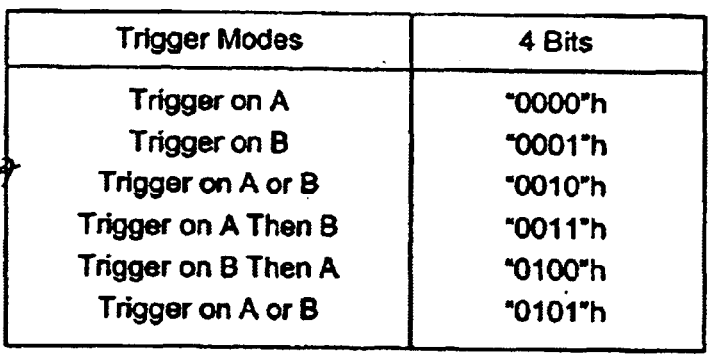
Figure 3:
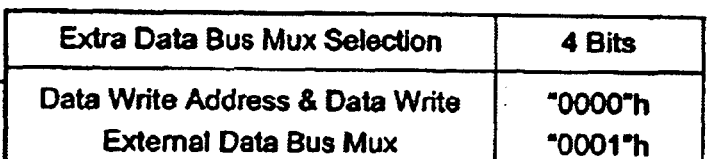

In an embodiment of the present invention, the control signals from the host system includes three 264 bit words for initialization and a command byte. As shown in FIG. 3, the sixteen least significant bits of the data words "Trigger A" 3a and "Trigger A" 3b are allotted for program counter. In the data word "Trigger B" 3c, the sixteen least significant bits are allotted for program counter, the next eight bits (bit 16 to 23) are allotted for offset register value, and the next four bits (bit 24–27) are allotted for trigger mode. FIG. 3d shows an exemplary code table for the four bit trigger mode bits of the data word 3c.

Figure 6:
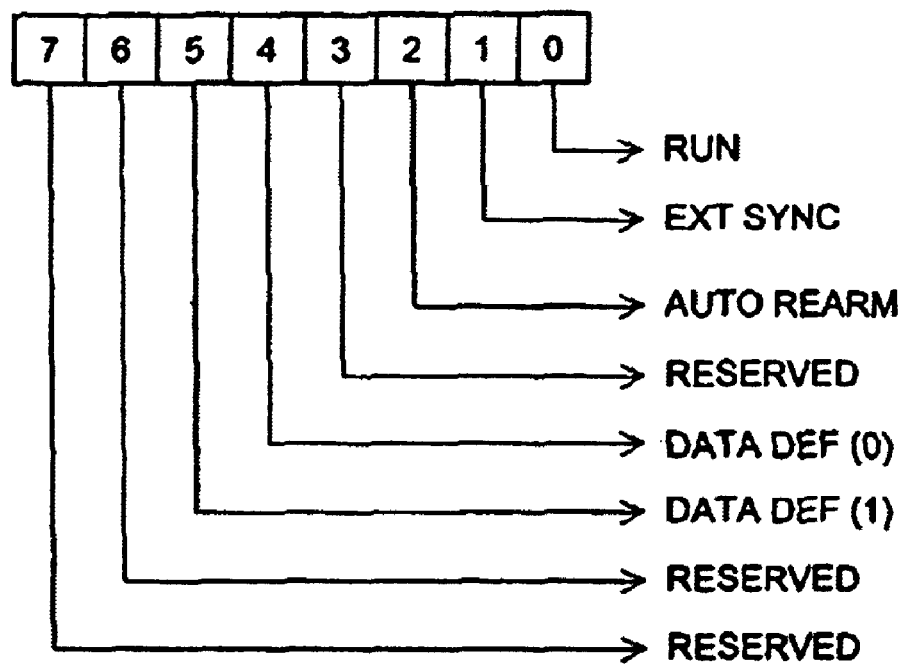
FIG. 6 depicts a data structure of a command signal transferred from a host system to a data capturing unit in accordance with the present invention.

FIG. 6 shows the command byte structure. Among the eight bits therein, the fourth, seventh and eighth bits are reserved. The first bit is allotted for indicating the "RUN" mode, which has been previously mentioned. With this bit set to "1", when the data/command word is loaded, the specific trigger is armed. The second bit is allotted for a "EXT SYNC" mode, which allows an external sync signal to be run from the OCLA system 10 to an outside hardware analyzer. In this mode, when the specific trigger condition is met, the OCLA_DATA pin 19a is pulsed for one DSP clock while no data is captured. The third bit is an "AUTO REARM" bit. With this bit is set to "1", when the trace buffer 24 has been emptied by a PC controller, the specific trigger is automatically rearmed. The fifth and sixth bits, labeled as "DATA DEF" bits, indicates the data that will follow the command byte. For example, when these two bits are set to "00"h, "01"h and "10"h, data words "trigger A", "trigger A mask" and "trigger B with configuration" are followed, respectively.

Figure 4A:
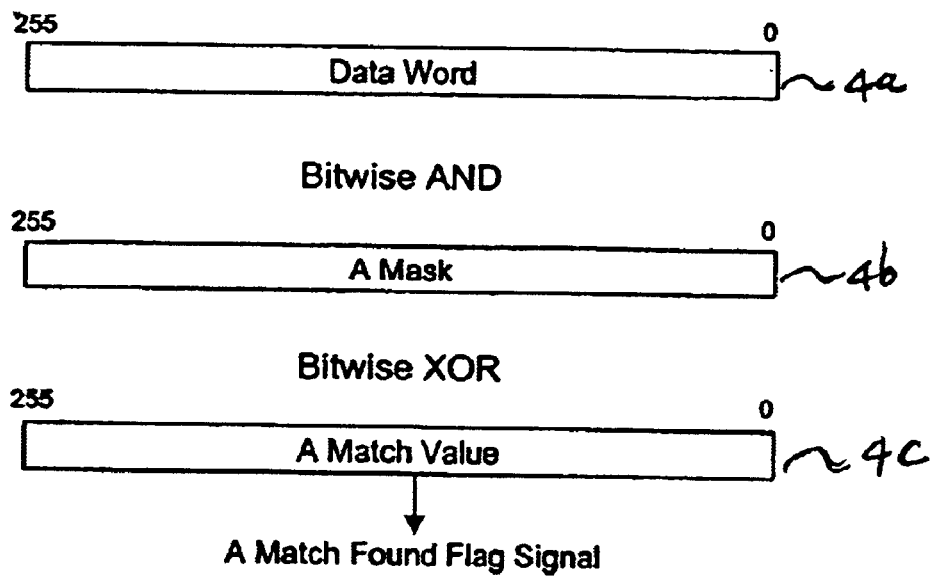
FIGS. 4A and 4B depict bitwise multiplexing operations performed by the data capturing unit in accordance with the present invention.
Figure 4B:
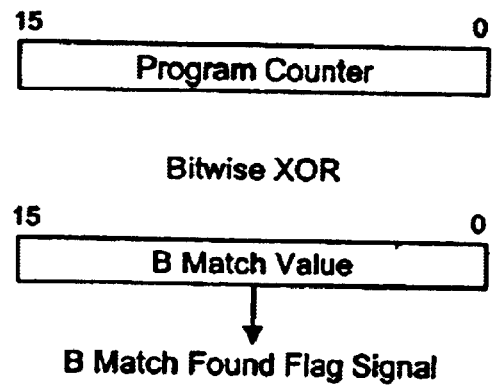

In FIG. 3, once the OCLA system 10 and the SOC device 12 are powered up, the host system 16 loads the current mode and associated trigger match and mask values. This is achieved by loading a trigger word including three 256 bit data words and one command byte. Each data word is as wide (256 bits) as the size of the trace buffer 24. As shown in FIG. 3, loading of the first trigger word 3a sets an "A" match value, and the second trigger word 3b holds an "A" mask value. These trigger words 3a, 3b are used to bring important signals out of the DSP core 28 into the data capturing unit 21. These signals are processed through a set of multiplexers and transferred into comparators provided in the data capturing unit 21. As shown in FIG. 4A, each bit of the trace word 4a (i.e., data word) from the DSP core 28 is then logically ANDed (i.e., bitwise AND) with the mask value 4b and then exclusive ORed (i.e., bitwise XOR) with the match value 4c. This combination creates many different scenarios with which the user can operated the OCLA system 10. In FIG. 3, The third word 3c loaded into the OCLA system 10 contains the mode information as well as a "B" match value. No mask value exists for the "B" trigger because, if a mode which requires a "B" trigger is to be used, it means all bits of the "B" trigger will be used. The third command which is loaded in with the third word 3c issues to the OCLA system 10 to begin running.

The OCLA system 10 may be operated by several operational modes: "Trigger on A" mode, "Trigger on A and B" mode, "Store only A" mode, "Store only A then B" mode, "Store only B then A" mode, "Store only A or B" mode, "External Synchronization" mode, and "Stop and Fill Buffer" mode. These modes are described to exemplarily show how the OCLA system 10 can be operated, and, therefore, the operation of the OCLA system 10 should not be limited by the modes described herein.

In the "Trigger on A" mode, when the "A" trigger is met, every cycle of the DSP core 28 is stored until the trigger offset register/counter is satisfied. When this condition is satisfied, a buffer-full condition occurs. The data signal is set to a "1" requesting the trace buffer 24 to be emptied by the PC (program counter) controller. The PC interface continues to clock until it empties all 64 trace buffer addresses. Once the trace buffer 24 is emptied, it remains inactive until a new command word is received if the auto rearm mode is not selected.

The "Trigger on A or B" mode is similar to the "Trigger on A" mode. This enhanced mode can have either the "B" trigger or "A" trigger condition met to freeze the capture process when the Offset register is satisfied. In the "Store only A" mode, when "A" trigger is met, only that cycle of the DSP core 28 is stored. This process continues until a buffer-full condition occurs. The data signal is set to a "1" requesting the trace buffer 24 to be emptied by the PC controller. The PC interface continues to clock until the trace buffer 24 empties all 64 trace buffer addresses. Once the trace buffer 24 is emptied, the trace buffer 24 will remain inactive until a new command word is received if the auto rearm mode is not selected.

In the "Store only A then B" mode, when the "A" trigger is met, that cycle of the DSP core 28 is captured and queued for transmission as well as arming the "B" trigger. The "A" logic value will be transmitted to the controller while waiting for the "B" trigger to occur. When the "B" trigger is met, that cycle of the DSP core 28 is captured and queued for transmission as soon as possible. When the auto rearm is enabled, the "A" trigger will be rearmed and the process will cycle continuously. This feature allows continuous monitoring of functions with main loop times of less than 50.2 Î¼s.

In the "store only B Then A" mode, when the "B" trigger is met, that cycle of the DSP is captured and queued for transmission as well as arming the "A" trigger. The "B" logic value will be transmitted to the controller while waiting for the "A" trigger to occur. When the "A" trigger is met that cycle of the DSP is captured and queued for transmission as soon as possible. When the auto rearm is enabled the "B" trigger will be rearmed and the proms will cycle continuously. This feature will allow continuous monitoring of functions with main loop times of less than 50.2 Î¼s. It should be noted that the "B" trigger is just a PC value trigger with out any mask capability.

In the "Store only A OR B" mode, when the "A" trigger or "B" trigger is met, that cycle of the DSP core 28 is captured and queued for transmission and will be transmitted to the controller as soon as possible. When the auto ream is enabled, the "A" OR "B" trigger is rearmed and the process cycles continuously. This feature will allow continuous monitoring of functions with main loop times of less than 50.2 Î¼s. It should be noted that the "B" trigger is just a PC value trigger without any mask capability.

In the "External Synchronization" mode, when the specified trigger condition is met, the OCLA_Data pin 19a is pulsed for one DSP clock. No data is captured. This mode is used to trigger external devices from the internal specified trigger condition. In the "Stop & Fill Buffer" mode, a signal clock received on the OCLA_Clock pin before a Buffer_Full signal (Data="1" in Run mode) will stop the OCLA system 10 and fill the trace buffer 24 until the offset register is satisfied. When this condition is satisfied, it causes a buffer-full condition to occur. The data signal is set to "1" requesting the trace buffer 24 to be emptied by the PC controller. The PC interface then continues to clock until it empties all 64 trace buffer addresses (1.65 Î¼s). When the trace buffer 24 is emptied, it remains inactive until a new command word is received even if the auto rearm mode is selected. This mode could be triggered by external circuitry from the control logic 20.

With these various modes, in the real-world environment, the OCLA system 10 are utilized for two main functions: hardware debugging and software debugging. Regarding the hardware debugging, the trigger modes serve as hardware debug modes. When specific condition is realized and when that condition was met, the 64 deep trace buffer 24 fills up with important data of the DSP core 28. In this respect, the OCLA system 10 would be operating more like a traditional logic analyzer. To give the user additional flexibility, an offset register is included in the OLCA system 10, which is loaded in the third command word. Once a run command has been issued in a "trigger on" mode, the trace buffer 24 is treated like a circular buffer which captures data once per a DSP clock cycle. When a trigger condition is met, the offset counter begins decrementing from the value initially loaded. If the offset counter is not zero, it continues capturing in the buffer and decrementing the counter. When the offset counter reaches zero, the VHDL macro 14 in the SOC device 12 indicates to the FPGA card in the host system 16 that the operation is complete and a download from the VHDL macro 14 to the FPGA begins.

Figures 5A, 5B:
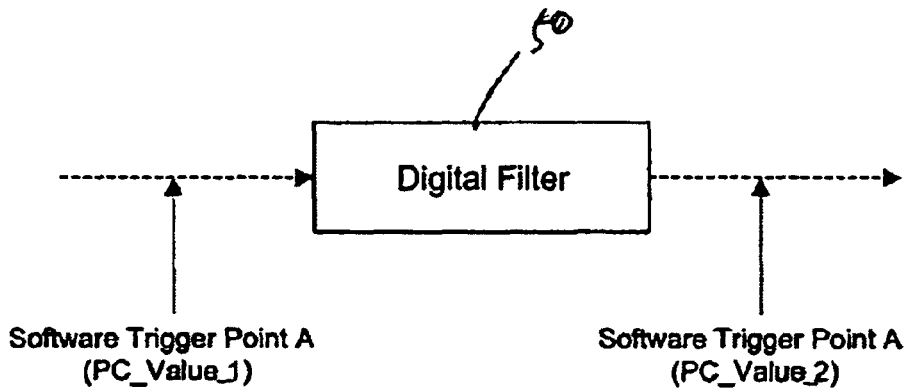
FIGS. 5A and 5B depict a digital filter operation in accordance with the present invention.

Store modes are primarily utilized for software debugging and test. In store modes, the user sets up the masks like in the trigger mode. FIG. 5 depicts a block diagram of a digital filter as a high level visualization of high level software simulation of DSP components, as well as the blueprint for the assembly language coding of the signal flow. The observation is made that specific localized points (nodes) within the VHDL macro 14 is trapped on by monitoring the program counter (PC) value and looking at the various registers and internal busses within the DSP system. For this purpose, the input-output relationship of a finite impulse response filter 50 in FIG. 5, which is deeply embedded within the system, is monitored. After this routine had been coded, it would be necessary to test and optimize it using real data. Since absolute PC locations of the code could be determined from the assembly language linkage process, it would be easy to make relationships between the two labels PC_value_1 and PC_value_2. Due to the straight line nature of this code, the operations are expected to occur in the order presented every time.

The first operation at PC_value_1 is loading the input value to the filter, and it's placement on one of the data memory busses is known from the operations. At this point the first software trap is performed, and the complete word is stored in the OCLA trace buffer 24. As processing of this routine continues, the second PC value (PC_value_2) is trapped and when it is reached the second store occurs.

The processing of real-time DSP code is very different from traditional code. In DSP code, a filter structure, of which an example is shown as the digital filter 50 in FIG. 5, is executed once per analog-to-digital conversion and an associated interrupt. In servo and audio applications, this interrupt occurs once per thousands of DSP instruction cycles. Therefore, there is plenty of time to offload the input and output until the next input point is reached again. To change the location of these software probes, the developer could simply load the A and B mask values to different program counter values. Thus, according to the present invention, it does not require the processor to be stopped, and is completely transparent to the execution of the code.

Therefore, according to the present invention, relevant data for testing and debugging an SOC device is captured without interrupting any internal operation of a VHDL macro because the data capturing logic is embedded within the VHDL macro to observe or watch the internal operations of the VHDL macro. Thus, the present invention enables non-obtrusive real-time data acquisition for a system-on-chip (SOC) signal processing systems.

While the invention has been described in terms of a single preferred embodiment, those skilled in the art will recognize that the invention can be practiced with modification within the spirit and scope of the appended claims.

What is claimed is:

1. An on-chip logic analysis (OCLA) system comprising:
   a single chip device internally including a signal processing unit, a plurality of memory blocks and a data capturing unit; and
   a host unit externally provided to said single chip device and generating control signals to control said data capturing unit,
   wherein said data capturing unit captures data processed by said signal processing unit in response to said control signals from said host unit and transfers said captured data to said host unit without interrupting operations of said signal processing unit.

2. The OCLA system of claim 1, further comprising:
   a first signal path transferring a clock signal from said host unit to said data capturing unit; and
   a second signal path transferring said control signals from said host unit to said data capturing unit and transferring said captured data from said data capturing unit to said host unit.

3. The OCLA system of claim 2, wherein said single chip device comprises:
   a first pin utilized for providing said first signal path between said host unit and said data capturing unit; and a second pin utilized for providing said second signal path between said host unit and said data capturing unit.

4. The OCLA system of claim 1, wherein said data capturing unit comprises:
   a control unit controlling operations of said data capturing unit in response to the control signals from said host unit;
   a buffer unit storing said data processed by said signal processing unit; and
   a communication unit transferring said control signals from said host unit to said control unit and transferring said data captured by said buffer unit to said host unit.

5. The OCLA system of claim 4, wherein said buffer unit comprises a static random access memory (SRAM).

6. The OCLA system of claim 4, wherein said control unit includes a trigger unit for monitoring said data processed by said signal processing unit to determine a current trigger mode of said OCLA system.

7. The OCLA system of claim 1, further comprising a user interface enabling a user to control said OCLA system and presenting said captured data to the user.

8. The OCLA system of claim 7, wherein said user interface is a graphic user interface (GUI).

9. The OCLA system of claim 7, wherein the host unit comprising:
   an interface unit transferring said controls signals from said host system to said data capturing unit and transferring said captured data from said data capturing unit to said host unit; and
   a memory unit storing said control signals and said captured data.

10. The OCLA system of claim 9, wherein said interface unit and said memory unit are implemented in a personal computer international standard architecture (PC ISA) interface card.

11. The OCLA system of claim 10, wherein said interface unit is implemented as a field programmable gate array (FPGA) attached on said PC ISA card.

12. The OCLA system of claim 7, wherein said user interface is synchronized with said host unit in a real-time basis.

13. The OCLA system of claim 1, wherein said data capturing unit determines which one of said plurality of memory blocks is active based on an internal chip enable signal of said single chip device.

14. The OCLA system of claim 1, wherein each unit of said control signals comprises:
   a data portion designating at least one mask value, a match value and a trigger mode; and
   a command portion designating a current operational mode to be performed in response to a current unit of said control signal.

15. The OCLA system of claim 14, wherein said control unit loads a trace word from said captured data and performs multiplexing operations by using said mask value and match value.

16. The OCLA system of claim 15, wherein said multiplexing operations comprising:
   a masking operation by bitwise ANDing said trace word and said mask value; and
   a matching operation by bitwise eXclusive-ORing of said masked trace word and said match value.

17. An on-chip very high speed integrated circuit (VHSIC) hardware description language (VHDL) macro embedded in a single chip device comprising:
   digital signal processing (DSP) core logic; and
   on-chip logic analysis (OCLA) logic capturing data processed by said DSP core logic without interrupting operations of said DSP logic, wherein said OCLA logic is controlled by a host unit externally provided to said single chip device.

18. The VHDL macro of claim 17, wherein said OCLA logic comprises:
   control logic for controlling operations of said OCLA logic in response to control signals from said host unit;
   a buffer capturing data processed by said DSP core logic; and
   communication logic for transferring said control signals and said captured data between said VHDL macro and said host unit.

19. A single chip device comprising:
   a signal processing unit;
   a plurality of memory blocks;
   a on-chip logic analysis (OCLA) unit capturing data processed by said signal processing unit without interrupting operations of said signal processing unit, wherein said OCLA unit is controlled by a host unit externally provided to said single chip device.

20. The signal chip device of claim 19, further comprising:
   a first chip pin for providing a serial data path between said single chip device and said host unit; and
   a second hip pin for providing a clock signal path between said single chip device and said host unit.

21. The single chip device of claim 19, wherein said OCLA unit comprising:
   a control unit for controlling operations of said OCLA unit in response to control signals from said host unit;
   a buffer capturing data processed by said signal processing unit; and
   a communication unit for transferring said captured data between said VHDL macro and said host unit.

* * * * *